US012798965B2

(12) United States Patent
Byl

(10) Patent No.: US 12,798,965 B2
(45) Date of Patent: Nov. 17, 2026

(54) STORAGE AND DELIVERY VESSEL FOR STORING $GeH_4$, USING A ZEOLITIC ADSORBENT

(71) Applicant: ENTEGRIS, INC., Billerica, MA (US)

(72) Inventor: Oleg Byl, Southbury, CT (US)

(73) Assignee: Entegris, Inc., Billerica, MA (US)

( * ) Notice: Subject to any disclaimer, the term of this patent is extended or adjusted under 35 U.S.C. 154(b) by 812 days.

(21) Appl. No.: 18/094,160

(22) Filed: Jan. 6, 2023

(65) Prior Publication Data

US 2023/0227309 A1 Jul. 20, 2023

Related U.S. Application Data

(60) Provisional application No. 63/300,623, filed on Jan. 18, 2022.

(51) Int. Cl.

| | |
|---|---|
| ***C01B 6/06*** | (2006.01) |
| ***B01J 20/22*** | (2006.01) |
| ***F17C 9/00*** | (2006.01) |
| ***F17C 11/00*** | (2006.01) |

(52) U.S. Cl.

CPC ............... *C01B 6/06* (2013.01); *B01J 20/226* (2013.01); *F17C 9/00* (2013.01); *F17C 11/00* (2013.01); *F17C 2201/0104* (2013.01); *F17C 2201/058* (2013.01); *F17C 2221/01* (2013.01); *F17C 2223/031* (2013.01)

(58) Field of Classification Search

CPC ........ C01B 6/06; C01B 3/0026; B01J 20/226; B01J 2220/66; F17C 9/00; F17C 11/00; F17C 2201/0104; F17C 2201/058; F17C 2221/01; F17C 2223/031; F17C 7/00

See application file for complete search history.

(56) References Cited

U.S. PATENT DOCUMENTS

| | | | |
|---|---|---|---|
| 5,851,270 A | 12/1998 | Olander | |
| 6,716,271 B1 | 4/2004 | Arno et al. | |
| 9,273,829 B2 | 3/2016 | Weickert et al. | |
| 9,751,074 B2 | 9/2017 | Kim et al. | |
| 10,940,426 B2 | 3/2021 | Tom et al. | |
| 2009/0214407 A1 | 8/2009 | Reyes | |
| 2015/0352519 A1* | 12/2015 | Kim .................. | B01J 20/28066 556/52 |
| 2016/0256851 A1 | 9/2016 | Glover | |
| 2020/0088352 A1 | 3/2020 | Despres et al. | |
| 2020/0206717 A1 | 7/2020 | Dubois et al. | |

FOREIGN PATENT DOCUMENTS

| | | |
|---|---|---|
| CN | 1723072 A | 1/2006 |
| CN | 102015065 A | 4/2011 |
| CN | 104105700 A | 10/2014 |
| CN | 105813711 A | 7/2016 |
| CN | 112689728 A | 4/2021 |
| WO | 2003097215 A1 | 11/2003 |
| WO | 2015020964 A1 | 2/2015 |

* cited by examiner

*Primary Examiner* — Anthony J Zimmer
*Assistant Examiner* — Logan Laclair

(57) ABSTRACT

Described are storage and dispensing systems and related methods for the selective dispensing germane ($GeH_4$) as a reagent gas from a vessel in which the germane is held in sorptive relationship to a solid adsorbent medium that includes zeolitic imidazolate framework.

6 Claims, 5 Drawing Sheets

| | Example 1 |
|---|---|
| Initial pressure of tested cylinders | 443 (Torr) |
| Mass of dry adsorbent | 937 (grams) |
| Initial total capacity of tested cylinders | 118 (grams) |
| Duration of 522 sccm sustained flow of tested cylinders | 44 minutes |
| Deliverable capacity 540-to-75 Torr at 522 sccm set point, non-equilibrium | 78 (grams) |
| Deliverable capacity 540-to-75 Torr at equilibrium | 101 (grams) |

Figure 2B

STORAGE AND DELIVERY VESSEL FOR STORING $GeH_4$, USING A ZEOLITIC ADSORBENT

FIELD

The invention relates generally to storage and dispensing systems, and related methods, for the selective dispensing of germane ($GeH_4$) as a reagent gas from a vessel in which the germane is held in sorptive relationship to a solid adsorbent medium that includes a zeolitic imidazolate framework.

BACKGROUND

Raw materials in the form of highly pure gases ("reagent gases") are required for manufacturing semiconductor materials (e.g., wafers) and microelectronic devices. Gaseous raw materials are needed for processes that include ion implantation, expitaxial growth, plasma etching, reactive ion etching, metallization, physical vapor deposition, chemical vapor deposition, atomic layer deposition, plasma deposition, photolithography, cleaning, and doping, among others.

One example of a highly-pure reagent gas is germane ($GeH_4$), which finds uses in deposition techniques, ion implantation, and epitaxial growth. For use in these processes, germane must be supplied to a process in a substantially pure form and from a safe and reliable supply.

Germane is a hydride compound that is known to be unstable and susceptible to spontaneous exothermic decomposition. To store, handle, and supply germane under suitably safe conditions, various storage systems store the germane in a diluted form in combination with an inert stabilizing gas such as nitrogen, hydrogen, or helium, at a germane concentration of as low as 20, 10, or 5 percent germane (on a volume basis) in the stabilizing gas. The stabilizing gas dilutes the germane and reduces the risk of decomposition. But, the diluted germane (combined with stabilizing gas) is significantly less useful compared to a more concentrated form of gaseous germane, especially for use in certain types of deposition processes that require a high flow of concentrated germane.

In other storage systems, non-diluted germane may be stored in adsorbed form in a vessel that contains a solid adsorbent material, i.e., in an "adsorbent-based" storage system. These systems contain a porous adsorbent material held inside of a storage vessel, with the germane gas being stored in an adsorbed state on the adsorbent material.

For certain uses of germane as a reagent gas, an added feature of a system for storing and delivering germane is an ability to deliver concentrated germane (i.e., not substantially diluted) at a high flow (e.g., characterized as standard cubic centimeters per minute or "sccm") for a sustained and extended delivery period. High flow delivery of concentrated germane requires rapid desorption kinetics, a lower (compared to other adsorbents) adsorption energy of gaseous germane at an adsorbent surface, and rapid diffusion dynamics for a quick delivery of the desorbed gas from the interior of the adsorbent to the gas phase of the storage vessel. To sustain high flow delivery of a reagent gas for an extended delivery period, a storage system must also exhibit a sufficient storage capacity of the reagent gas with a high deliverable storage capacity, meaning that a high amount (percentage) of stored reagent gas can be removed from an adsorbent and delivered from the storage vessel. In addition, the vessel and the adsorbent need to possess high enough thermal conductivity to conduct thermal energy from the exterior surface of the vessel into the adsorbent to reduce cooling of the adsorbent during the high flow dispensing of the adsorbed gas.

A higher amount of deliverable germane in a storage vessel (a higher "deliverable gas capacity"), especially in a high flow delivery application, improves efficiency of a process that uses the storage vessel because the storage vessel may be used for a longer period of time between replacements. With fewer replacements of a storage vessel, equipment downtime is reduced and operating efficiency is increased. Additionally, a reduced amount of the expensive gaseous raw material is left unused, i.e., wasted, within the storage vessel.

SUMMARY

The Applicant has determined that zeolitic adsorbents are capable of providing high flow delivery of concentrated gaseous germane stored in an adsorbed state, for a continuous delivery period that is greater than a comparable combination of flow and delivery period of other adsorbents.

A storage system of the present description contains an amount of concentrated germane in a storage vessel. The storage vessel also contains zeolitic imidazolate framework (ZIF) adsorbent, with at least a portion of the germane being adsorbed at surfaces of the adsorbent.

As determined by the Applicant, zeolitic imidazolate framework adsorbent for storing concentrated germane has useful and advantageous performance properties. One useful performance property is an ability to deliver a high flow of stored concentrated germane over a sustained amount of time (delivery period). Example systems are useful to supply a flow of at least 250 standard cubic centimeters of germane per minute, for at least 30 minutes, per 2.2 liters of volume of the storage vessel.

In one aspect, the following describes methods of dispensing germane from a vessel. The vessel includes an interior volume that contains zeolitic imidazolate framework adsorbent and germane adsorbed on the adsorbent. Described methods include dispensing germane from the vessel at a dispense rate of at least 250 standard cubic centimeters per minute (per liter of vessel volume) for a dispensing period of at least 15 minutes.

BRIEF DESCRIPTION OF THE DRAWINGS

FIGS. 2A and 2B show performance data of an example storage system of the present description.

DETAILED DESCRIPTION

Figure 1:
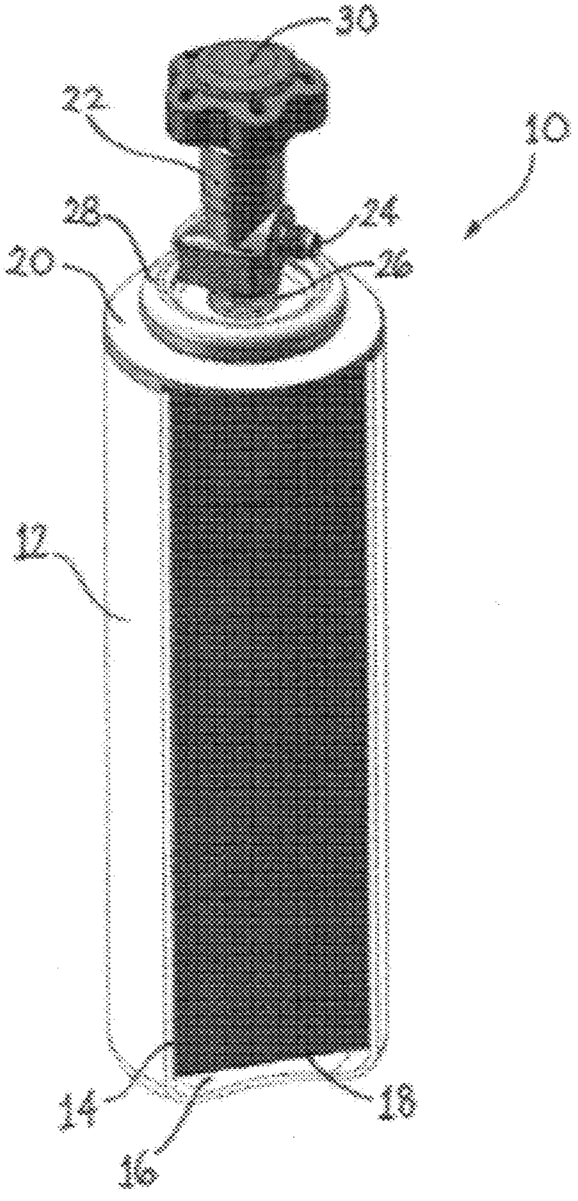
FIG. 1 shows an example storage system of the present description.

The present description relates to novel and inventive systems that involve storing germane in a vessel that contains zeolitic imidazolate framework adsorbent, with germane adsorbed to the adsorbent, and to novel and inventive methods of using the storage systems to store, handle, and deliver germane.

A storage system includes a vessel that contains zeolitic imidazolate framework (ZIF) adsorbent material at its interior. The adsorbent material is effective to contain and store germane within the storage vessel and to effectively deliver germane from the storage vessel, particularly at a high flow for a sustained amount of time. Germane is adsorbed on the zeolitic imidazolate framework adsorbent and is present as a gas at the vessel interior, with a portion of the germane being adsorbed by the zeolitic imidazolate framework, and another portion being in gaseous form or condensed and gaseous form and in equilibrium with the adsorbed portion.

The amount of zeolitic imidazolate framework adsorbent material in the interior vessel can vary depending the volumetric adsorption capacity of such material toward germane (mass of germane adsorbed on 1 liter of adsorbent). Less adsorbent material is needed for zeolitic imidazolate framework materials with higher volumetric capacity; correspondingly, a storage vessel may contain a volume of the adsorbent that is less than the internal volume of the vessel. The adsorbent material can fill 99%, 95%, 90%, 80%, 70%, 60%, 50%, or less than the internal volume of the vessel.

The pressure at the interior of the vessel may be sub-atmospheric, meaning below about 760 Torr (absolute). During storage of the vessel or during use of the vessel to dispense germane, the pressure at the interior of the vessel may be below 760 Torr, e.g., below 700, 600, 400, 200, 100, 50, or 20 Torr.

The stored germane in the vessel is concentrated, meaning not substantially diluted by an inert stabilizing gas; the stored gas in the vessel is at least 50, 60, 70, 80, 90, 95, of 99 percent (by volume) germane. The germane does not need to be stored in combination with an inert stabilizing gas (e.g., argon, nitrogen, helium), and the vessel may contain less than 50, 40, 30, 20, 10, 5, or 1 percent (by volume, based on total gas in the vessel) of any non-germane gas, such as a stabilizing gas.

According to an example storage system, a zeolitic imidazolate framework ("ZIF") adsorbent is included in a storage vessel that is adapted to store germane ($GeH_4$) at sub-atmospheric pressure, and to dispense the germane to semiconductor processing equipment. The Applicant has determined that the use of a zeolitic imidazolate framework as an adsorbent can allow for useful or preferred storage and delivery capabilities of germane, including the ability to deliver a high flow of the stored, concentrated germane, over a sustained delivery period; e.g., to deliver a flow of at least 250 sccm germane for a delivery period of at least 30 minutes, per vessel volume of 2.2 liters.

This performance, adjusted to a storage vessel volume of 1 liter, is equivalent to delivering 250 sccm germane for at least 15 minutes per 1 liter of storage vessel volume. A higher volume storage vessel that contains a correspondingly higher amount of the zeolite adsorbent is capable of delivering the same flow of germane for a correspondingly longer delivery period (i.e., twice a volume of adsorbent produces the same flow for a delivery period that is twice as long), or of delivering a greater flow of germane for the same delivery period (i.e., twice a volume of adsorbent can deliver twice a flow for the same delivery period), etc. For example, a 50 liter vessel that contains a correspondingly higher amount of the adsorbent may deliver a flow of 250 sccm germane for 682 minutes, or may deliver a flow of 500 sccm for 341 minutes.

The term "flow" as in "high flow" refers to a measure of flow of a gas in volume of the gas per minute (standard cubic centimeters per minute, sccm) at specified temperature and pressure. According to the present description, these standard conditions are a temperature of 0 degrees Celsius and a pressure of 760 Torr.

If described on an alternate basis of germane delivered from a vessel, the use of a zeolitic imidazolate framework as an adsorbent can allow for a desirably high amount (by weight) of germane delivered at a high flow, and at a typical operating temperature for semiconductor processing (e.g., 22 degrees Celsius). A preferred storage system can deliver at least 78 grams of germane at a flow of 200 sccm, per 2.2 liters of storage vessel volume. This performance, adjusted to a storage vessel volume of 1 liter, is equivalent to delivering 35 grams of germane at a flow of 200 sccm from a 1 liter storage vessel.

Germane, the chemical compound having the chemical formula $GeH_4$, also known as "germanium tetrahydride" or "germanomethane," is a known reagent gas used in the semiconductor industry.

According to the present description, germane is stored in a vessel that contains zeolitic imidazolate framework adsorbent, with germane being adsorbed on the zeolitic imidazolate framework adsorbent. The storage system is of a type known as an adsorbent-based storage system that includes a vessel that contains zeolitic imidazolate framework adsorbent. Zeolitic imidazolate framework adsorbents are known to be compositionally different from other known types of adsorption media such as carbon-based adsorption media, polymeric adsorption media, silica, etc.

Zeolitic imidazolate frameworks are a type of metal organic framework (MOF) that is known to be useful as an adsorbent for storing certain reagent gases, including for storage and delivery of reagent gases for use in semiconductor processing. Zeolitic imidazolate frameworks are metal organic frameworks that include a tetrahedrally-coordinated transition metal such as iron (Fe), cobalt (Co), Copper (Cu), or Zinc (Zn), connected by imidazolate linkers, which may be the same or different within a particular ZIF composition or relative to a single transition metal atom of a ZIF structure. The ZIF structure includes four-coordinated transition metals linked through imidazolate units to produce extended frameworks based on tetrahedral topologies. ZIFs are said to form structural topologies that are equivalent to those found in zeolites and other inorganic microporous oxide materials.

A zeolitic imidazolate framework can be characterized by features that include: a particular transition metal (e.g., iron, cobalt, copper, or zinc) of the framework; the chemistry of the linker (e.g., chemical substituents of the imidazolate units); pore size of the ZIF; surface area of the ZIF; pore volume of the ZIF; among other physical and chemical properties. Dozens (at least 105) of unique ZIF species or structures are known, each having a different chemical structure based on the type of transition metal and the type of linker (or linkers) that make up the framework. Each topology is identified using a unique ZIF designation, e.g., ZIF-1 through ZIF-105. For a description of ZIFs, including particular chemical compositions and related properties of a large number of known ZIF species, see Phan et al., "Synthesis, Structure, and Carbon Dioxide Capture Properties of Zeolitic Imidazolate Frameworks," Accounts of Chemical Research, 2010, 43 (1), pp 58-67 (Received Apr. 6, 2009).

Pore size of a ZIF can affect the performance of a ZIF as an adsorbent. Example ZIFs can have pore sizes in a range from about 0.2 to 13 angstroms, such as from 2 to 12 angstroms or from 3 to 10 angstroms. Pore size refers to the diameter of the largest sphere that will pass through the surface of the ZIF crystal. For use as an adsorbent in a vessel of the present description, a ZIF can have any pore size that is effective to provide desired storage performance.

One example of a ZIF that has been found to be useful in a vessel as described, for adsorbing concentrated germane gas in a vessel and storing the germane gas in the vessel at sub-atmospheric pressure, is referred to as "ZIF-8," which is zinc dimethylimidazolate (a.k.a. "zinc(dimethylimidazolate)

2." This zeolitic imidazolate framework is reported to have a pore size of 3.4 angstroms. See U.S. Pat. No. 9,138,720, describing ZIF-8 among other MOFs.

When contained in a vessel for storing germane as described herein, the zeolitic imidazolate framework can be in any useful form, such as granular (particles), monolithic, or otherwise. For various example embodiments, a preferred zeolitic imidazolate framework may be in the form of particles, which can be easily placed (e.g., poured) into a vessel such as a cylinder that includes a relatively small opening. Still, other forms of zeolitic imidazolate framework can also be useful or preferred for different product designs, including monolithic or block adsorbents, rods, or space-filling polyhedron adsorbents.

Useful or preferred ZIFs can be capable of providing a useful storage and delivery properties for stored, concentrated germane. These include a high flow rate of concentrated germane for a sustained amount of time. Other useful storage properties may include: useful storage capacity of concentrated germane, useful delivery capacity of concentrated germane, and, preferably, a relatively low amount (or rate) of degradation of stored, concentrated germane.

In example storage systems, a zeolitic imidazolate framework as an adsorbent can be used to deliver a high flow rate of the stored, concentrated germane, over a sustained delivery period; e.g., to deliver a flow of at least 50 sccm concentrated germane for a delivery period of at least 30 minutes, from a vessel having an internal volume of 2.2 liters. Storage vessels that have a larger internal volume may be used to contain a larger amount of the adsorbent, to allow for delivery of a higher flow of concentrated germane for a similar amount of time, or to allow for delivery of a comparable flow of concentrated germane (e.g., at least 50 sccm concentrated germane) for a greater amount of time, e.g., 40, 50, or 60 minutes.

In addition to delivering a high flow of concentrated germane for a sustained delivery period, examples of useful or preferred storage systems as described, for storage of concentrated germane adsorbed by zeolitic imidazolate framework adsorbent, can exhibit a useful storage capacity for germane, e.g., a storage capacity of at least 100 grams germane per liter of adsorbent (g/L), or preferably 200 g/L, or more preferably greater than 300 g/L.

The example storage systems can also exhibit a useful or advantageous deliverable capacity of concentrated germane, e.g., a deliverable capacity of at least 80, 90, 95, or 99 percent, meaning that the storage vessel can dispense at least 80, 90, 95, or 99 percent of a total amount of germane stored at the vessel interior. Example storage systems may dispense germane at a pressure as low as 50, 20, 10, 5, 3, 1, or 0.5 Torr.

Still further, concentrated germane may exhibit a favorable level of stability when stored on a ZIF adsorbent. Examples of useful or preferred systems of germane stored in a storage vessel that contains zeolitic imidazolate framework adsorbent can exhibit a useful or relatively low amount of germane decomposition during storage of the stored germane. For example, germane stored in a storage vessel as described may experience less than 1%, or preferably less than 0.1%, or more preferably less than 0.01% decomposition, based on total initial adsorbed germane capacity, over a period of 365 days at ambient temperature.

Within an exemplary vessel, at a temperature at which the vessel will be used to dispense the germane from the storage vessel (such as at 22 degrees Celsius), the contained germane can be in a form that includes a portion that is in a condensed or gaseous form (i.e., as gaseous germane), in equilibrium with germane that is adsorbed on the zeolitic imidazolate framework. The temperature of the vessel and germane can be within a range of temperatures to which the vessel may be exposed during use (e.g., a temperature in a range from about 0 to about 50 degrees Celsius). This range includes operating temperatures, which are typical temperatures at which the vessel will be held during controlled storage and use in an "ambient temperature" or room temperature environment, generally understood to include temperatures in a range from about 20 to about 26 degrees Celsius.

At a temperature at which the vessel will be used to deliver reagent gas, the gaseous germane can be at a sub-atmospheric pressure, i.e., at a pressure of below about 1 atmosphere (760 torr), absolute. The internal pressure of the vessel may be in this range during use, and may be highest when the vessel contains a maximum amount of germane, i.e., when the vessel is "filled" with germane. During use, as germane is gradually removed from the vessel, the internal vessel pressure will gradually be reduced and may reach a pressure that is below 700, 600, 400, 200, 100, 50, 20, 10, 5, 3, 1, or 0.5 Torr.

A vessel of a storage system as described may contain zeolitic imidazolate framework adsorbent as the only type of adsorption media present at the vessel interior, or, if desired, may contain zeolitic imidazolate framework adsorbent in combination with another type of adsorption media. In certain presently preferred embodiments, adsorption media contained in a vessel may be substantially (e.g., at least 50, 80, 90, 95, or 97 percent) or entirely zeolitic imidazolate framework adsorbent as described herein, and other types of adsorption media are not required and may be excluded from the vessel interior. In other words, the total amount of adsorbent that is contained at an interior of a vessel may comprise, consist essentially of, or consist of zeolitic imidazolate framework adsorbent, particularly including the general and specific types of zeolitic imidazolate framework adsorbents described herein.

According to the present description, a composition that consists essentially of a specified material or combination of materials is a composition that contains the specified material or materials and not more than an insignificant amount of any other material, e.g., not more than 2, 1, 0.5, 0.1, or 0.05 percent by weight of any other material. For example, a description of a vessel interior that contains adsorbent that consists essentially of zeolitic imidazolate framework adsorbent refers to a vessel having an interior that contains the zeolitic imidazolate framework adsorbent and not more than 2, 1, 0.5, 0.1, or 0.05 percent by weight of any other type of adsorption media, based on total weight adsorption media at the vessel interior.

Various examples of vessel structures for storing reagent gases can be useful for storing germane, using zeolitic imidazolate framework as adsorbent, by adaptation according to the present description. Example vessels include cylindrical containers ("cylinders") that include rigid cylindrical sidewalls that define a vessel interior and an outlet (or "port") at an end of the cylinder. The vessel sidewalls can be made of metal or another rigid, e.g., reinforced, material, and are designed to withstand a level of pressure that safely exceeds a desired maximum pressure recommended for containing reagent gas at the interior of the vessel.

FIG. 1 shows an example of a fluid supply system (or "gas storage system" or simply "storage system") as described, in which zeolitic imidazolate framework adsorbent is disposed for storage of and delivery of germane. As illustrated, fluid supply package 10 comprises vessel 12 that includes a cylindrical wall 14 and floor enclosing an interior volume 16 of vessel 12 in which is disposed zeolitic imidazolate framework adsorbent 18. Vessel 12 at its upper end portion is joined to cap 20, which may be of planar character on its outer peripheral portion, circumscribing upwardly extending boss 28 on the upper surface thereof. Cap 20 has a central threaded opening receiving a correspondingly threaded lower portion 26 of a fluid dispensing assembly.

Valve head 22 is movable between open and closed positions by any suitable action, such as by turning manually operated hand wheel or pneumatically operated activator 30 coupled therewith. The fluid dispensing system includes an outlet port 24 for dispensing gaseous germane from the fluid supply system when the valve is opened by operation of the hand wheel 30.

The zeolitic imidazolate framework adsorbent 18 in the interior volume 16 of vessel 12 may be of any suitable type as herein disclosed, and may for example comprise adsorbent in a powder, particulate, pellet, bead, monolith, tablet, or other appropriate form. The zeolitic imidazolate framework adsorbent has sorptive affinity for the germane to allow storage of and dispensing of the germane within the vessel. Dispensing may be performed by opening valve head 22 to accommodate desorption of germane that is stored in an adsorbed form on the adsorbent, and discharge of germane from the vessel through the fluid dispensing assembly to the outlet port 24 and associated flow circuitry (not shown), wherein the pressure at the outlet port 24 causes pressure-mediated desorption and discharge of germane from the fluid supply package. For example, the dispensing assembly may be coupled to flow circuitry that is at lower pressure than pressure in the vessel for such pressure-mediated desorption and dispensing, e.g., a sub-atmospheric pressure appropriate to a downstream tool coupled to the fluid supply package by the flow circuitry. Optionally, dispensing may include opening valve head 22 in connection with heating of the adsorbent 18 to cause thermally-mediated desorption of fluid for discharge from the fluid supply package.

The fluid supply package 10 may be charged with germane for storage on the adsorbent by an initial evacuation of fluid from the interior volume 16 of vessel 12, followed by flow of germane into the vessel through outlet port 24, which thereby serves a dual function of charging as well as dispensing of fluid from the fluid supply package. Alternatively, valve head 22 may be provided with a separate fluid introduction port for charging of the vessel and the loading of the adsorbent with the introduced fluid.

Germane in the vessel may be stored at any suitable pressure condition, preferably at sub-atmospheric pressure or low sub-atmospheric pressure, thereby enhancing the safety of the fluid supply package in relation to fluid supply packages such as high pressure gas cylinders.

EXAMPLES

Example 1

Figure 2A:
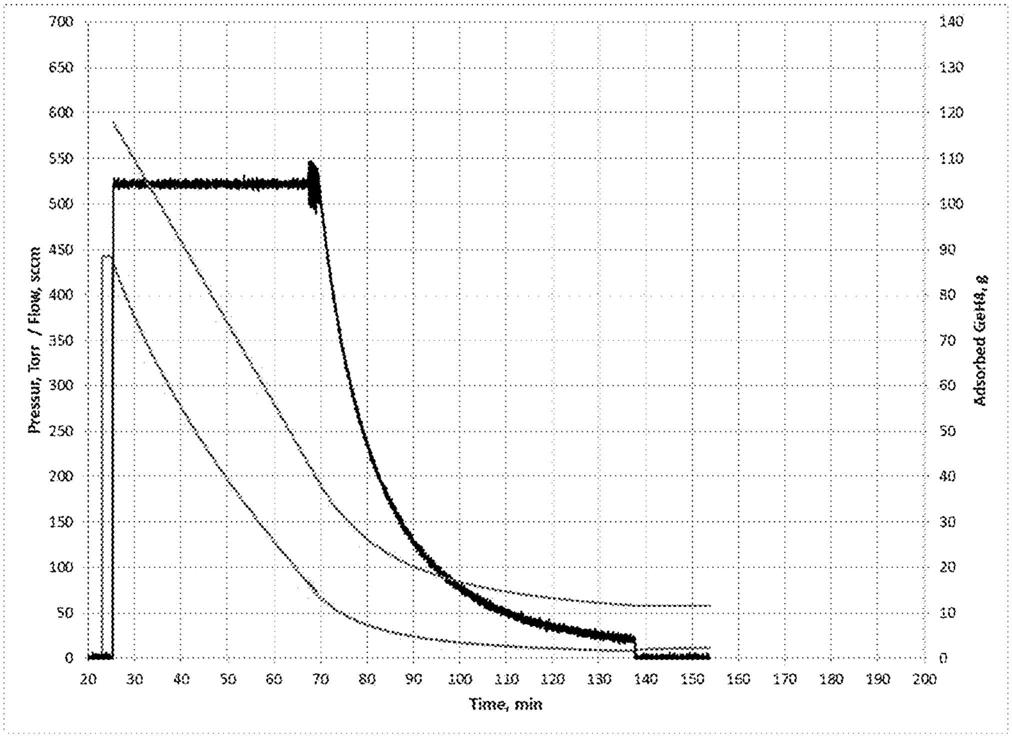

FIG. 2A is a graph of a process of delivering germane from a storage system as described. The graph shows a period of time during which germane (at approximately 100 percent concentration) is delivered from a storage vessel having a volume of 2.2 liters, which is filled with ZIF-8 adsorbent (ZIF-8 MOF extrudate). The ZIF-8 adsorbent in the 2.2 liter vessel sustained a controlled 522 sccm flow for approximately 44 minutes when flowed from cylinder pressure of 443 Torr to 75 Torr, to deliver approximately 76 grams of germane. The flow continued after the vessel reached 75 Torr, though at lower than 522 sccm flow rate. Additional ~25 grams of germane can be delivered at progressively lower rates from 75 Torr to 20 Torr. Additional flow duration at 522 sccm can be realized if the starting pressure of the test cylinder was higher than 443 Torr. For example, an additional 18 grams of $GeH_4$ can be delivered by starting at a pressure of 540 Torr.

FIG. 2B is a table that shows conditions and performance of the storage vessel of this Example 1. 937 grams of a dry ZIF-8 adsorbent was added to a high-pressure cylinder with 2.2-liter internal volume. A total of 118 grams of germane was adsorbed to a 443 Torr equilibrium pressure. The storage vessel was used for a flow test for determining the duration of a sustained flow rate at 522 sccm. The flow can be sustained for 44 min, and 78 grams of $GeH_4$ can be delivered under the conditions of this experiment. Higher deliverable quantity can be realized at a higher starting pressure and flow conditions closer to equilibrium. Calculation of a deliverable capacity from a pressure of 540 Torr to 75 Torr at equilibrium was determined to be 101 grams and it was done using data from the isotherm in FIG. 3.

Example 2

Figure 3:
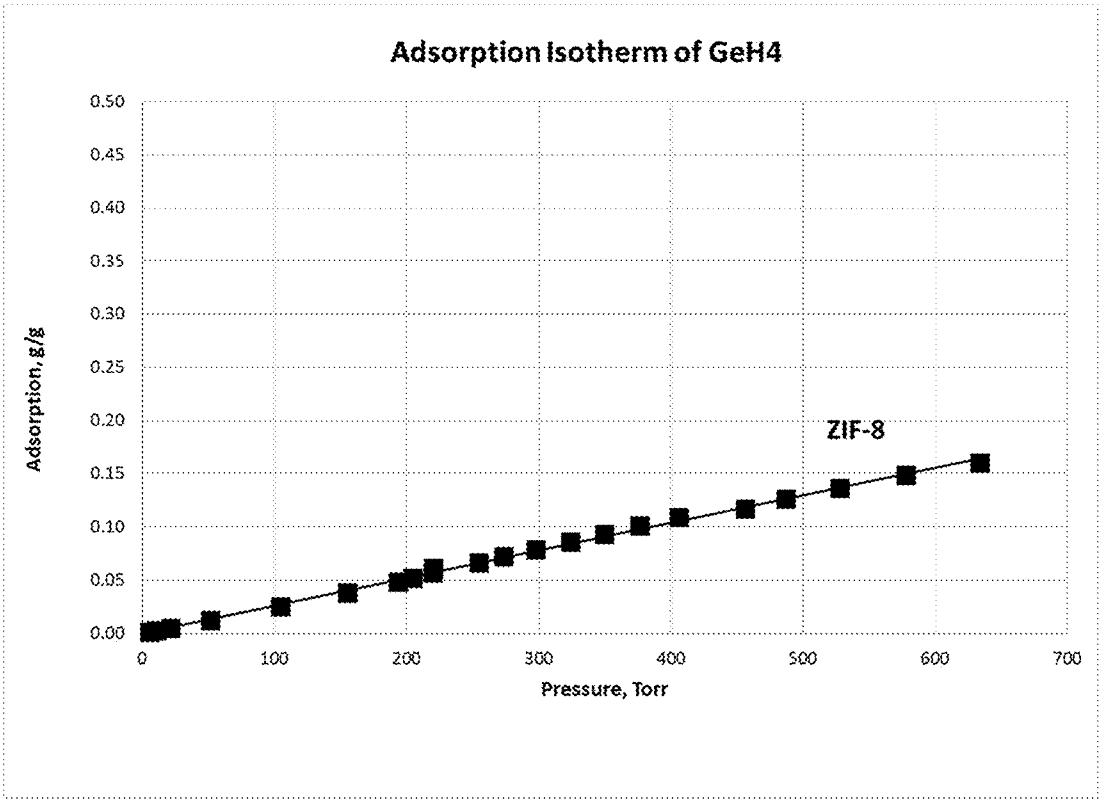
FIGS. 3 and 4 show performance data of an example storage system of the present description.

FIG. 3 is a table of adsorption of germane on ZIF-8 (grams germane per gram ZIF-8) in a storage vessel as described, at sub-atmospheric pressure, relative to delivery pressure. The linear shape of the line of this data indicates that a high percentage of the germane contained in the vessel is deliverable. In addition, a linear relationship between pressure and adsorption allows easy determination of the amount of $GeH_4$ stored in a ZiF-8 filled cylinder when it is connected for use, in contrast to a more complicated relationship for a carbon filled cylinder.

Figure 4:
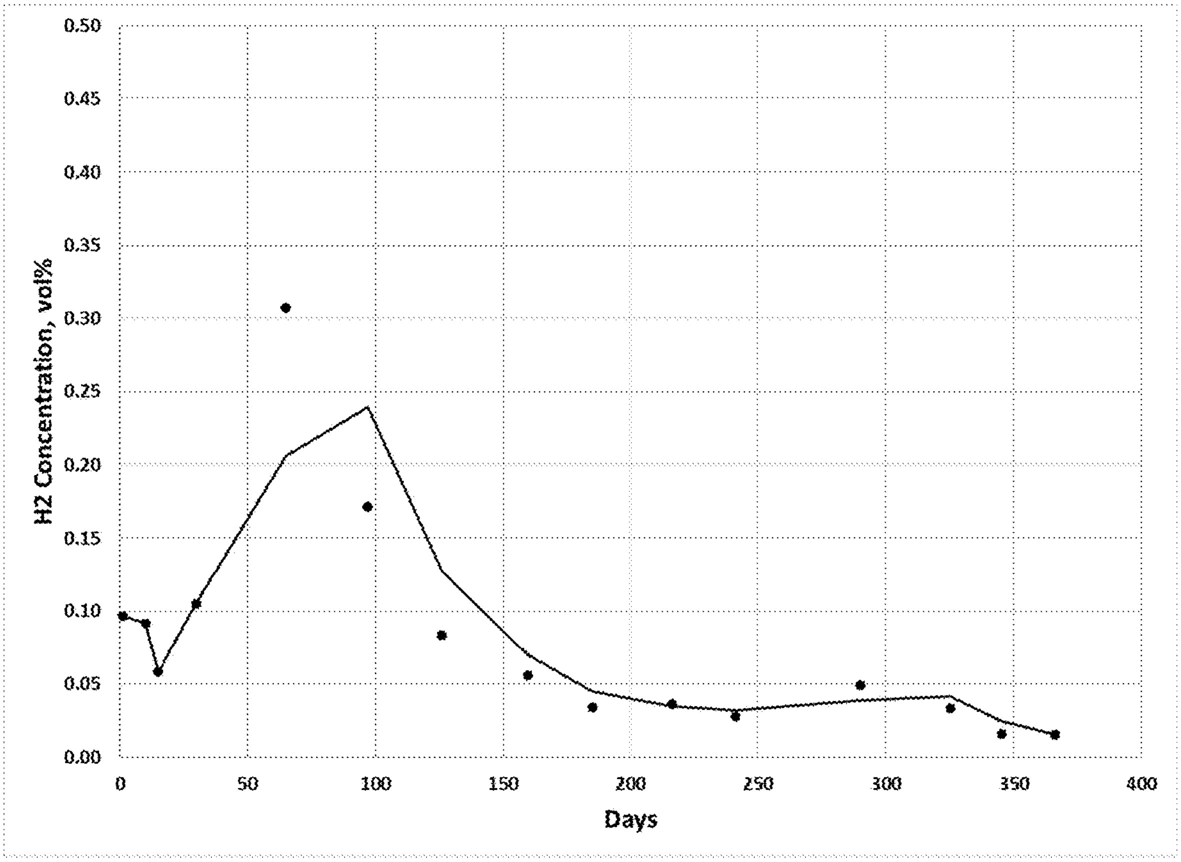

FIG. 4 shows hydrogen content of germane stored on ZIF-8 over extended periods of storage.

The following table shows amounts of germane held by an amount of ZIF-8 in a storage system as described, at different pressures. Also described are amounts that may be delivered from the system, and deliverable capacity of the system.

ZIF-8 adsorbent storage system

| | Grams germane per kilogram ZIF-8 | Deliverable capacity |
|---|---|---|
| full @ 550 Torr | 143 stored | |
| Heel @ 20 Torr | 5 stored | |
| Heel @ 10 Torr | 3 stored | |
| Heel @ 5 Torr | 2 stored | |
| Deliverable @ 20 Torr | 138 delivered | 96.5% |
| Deliverable @ 10 Torr | 140 delivered | 97.9% |
| Deliverable @ 5 Torr | 142 delivered | 99.3% |

For this Example, relevant features of the storage vessel, germane, and packaging and testing conditions are as follows:

The initial hydrogen content of the germane when charged to the vessel: less than 10 ppmV (parts per million by volume);

Total volume of the storage vessel: 0.5 liters;

The amount (mass) of ZIF in the storage vessel: 140 grams;

Surface area of the ZIF: 1500-1600 $m^2/g$ nitrogen BET surface area;

Shape and form of the ZIF: Extrudates, 1-3 mm in diameter, 1-5 cm long;

Temperature of the storage vessel and adsorbent for charging: $GeH_4$ was charged at 21 C in temperature controlled enclosure;

Vessel and ZIF treatment before charging: ZIF-8 was stored in a glove-box atmosphere of <10 ppm $O_2$ and <2 ppm $H_2O$ level at all times; the storage vessel was loaded with ZIF-8 in the glovebox to prevent air impurities from adsorbing on the material; the storage vessel with ZIF-8 was heated at 150 C while pumping for 24 hours to remove adsorbed air impurities including water.

At FIG. 3, adsorption of $GeH_4$ on ZIF-8 was determined gravimetrically. The net amount of ZIF-8 was measured after loading and evacuating the test cylinder. Weight change was measured after the first charge of $GeH_4$ upon and every time after withdrawal of an amount of $GeH_4$ to reach a stable target pressure. Pressure was measured with a capacitance manometer, (MKS model 722 "Baratron").

At FIG. 4, details of the technique and equipment used to measure $H_2$ concentration of delivered samples of germane periodically over periods of days of storage:

Storage conditions (temperature): 21 C in temperature controlled enclosure.

Gas chromatography technique for measuring $H_2$ in delivered germane: gas chromatograph with thermal conductivity detector, TCD, using Gow-Mac Series 580 GC test apparatus, Hayesep porous polymer columns, and 50 C 35 $cm^3$/min temperature and flow rate.

The invention claimed is:

1. A storage vessel containing an adsorbent comprising:
zeolitic imidazolate framework (ZIF) adsorbent; and
germane adsorbed on at least a portion of the ZIF adsorbent, wherein the storage vessel is used for dispensing germane from the storage vessel, and wherein after the storage vessel is stored at ambient temperature for a period of 365 days, an amount of germane that has decomposed is less than 2% of the amount of germane initially adsorbed.

2. The storage vessel of claim 1, wherein the storage vessel has a storage capacity of at least 100 grams germane per liter of adsorbent (g/L).

3. The storage vessel of claim 1, wherein the storage vessel has a storage capacity of at least 200 g/L.

4. The storage vessel of claim 1, wherein the storage vessel has a storage capacity of at least 300 g/L.

5. The storage vessel of claim 1, wherein the amount of germane that has decomposed is less than 0.5% of the amount of germane adsorbed.

6. The storage vessel of claim 1, wherein the amount of germane that has decomposed is less than 0.1% of the amount of germane adsorbed.

* * * * *